(12) United States Patent
Tajima et al.

(10) Patent No.: US 9,356,550 B2
(45) Date of Patent: May 31, 2016

(54) MOTOR CONTROLLER HAVING ABNORMALITY DETECTION FUNCTION OF POWER TRANSMISSION UNIT BETWEEN MOTOR AND MAIN SHAFT

(71) Applicant: FANUC CORPORATION, Minamitsuru-gun, Yamanashi (JP)

(72) Inventors: Daisuke Tajima, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/550,285

(22) Filed: Nov. 21, 2014

(65) Prior Publication Data

US 2015/0145460 A1   May 28, 2015

(30) Foreign Application Priority Data

Nov. 28, 2013 (JP) .................................. 2013-246405

(51) Int. Cl.
*H02P 23/00* (2006.01)
*B60L 3/00* (2006.01)
*B60L 3/12* (2006.01)

(52) U.S. Cl.
CPC ........... *H02P 23/0036* (2013.01); *B60L 3/0023* (2013.01); *B60L 3/12* (2013.01); *B60L 2240/486* (2013.01); *Y02T 10/642* (2013.01)

(58) Field of Classification Search
CPC ... B60L 3/0023; B60L 3/12; B60L 2240/486; Y02T 10/642
USPC ........... 318/490, 139; 702/151; 123/399, 492; 250/231.13; 324/207.25; 477/107
See application file for complete search history.

(56) References Cited

U.S. PATENT DOCUMENTS

| | | | | |
|---|---|---|---|---|
| 4,740,690 A | * | 4/1988 | Mosier | G01D 5/34792 250/231.18 |
| 5,350,955 A | * | 9/1994 | Street | G01D 5/25 324/160 |
| 5,786,781 A | * | 7/1998 | Taniguchi | G01D 5/24476 341/111 |
| 6,304,825 B1 | * | 10/2001 | Nowak | G03G 21/145 340/870.32 |
| 7,229,372 B2 | * | 6/2007 | Shimanaka | F16H 61/66272 474/18 |
| 7,375,487 B2 | * | 5/2008 | Miyashita | H02P 6/165 318/602 |

(Continued)

FOREIGN PATENT DOCUMENTS

| | | |
|---|---|---|
| CN | 1681680 A | 10/2005 |
| CN | 202703295 | 1/2013 |

(Continued)

*Primary Examiner* — Rita Leykin
(74) *Attorney, Agent, or Firm* — RatnerPrestia

(57) ABSTRACT

A motor controller includes: a motor rotation angle acquisition unit acquiring the rotation angle of the motor; a main shaft rotation angle acquisition unit acquiring the rotation angle of the main shaft; a one-rotation signal acquisition unit acquiring a one-rotation signal output every time the main shaft rotates once; a motor rotation speed calculation unit calculating the rotation speed of the motor from the rotation angle of the motor; a main shaft speed calculation unit calculating the rotation speed of the main shaft from the rotation angle of the main shaft; and an abnormality determination unit in which, when a change amount of the rotation angle of the motor or when the difference between the rotation speed of the motor and the rotation speed of the main shaft deviates from a second range, it is determined that an abnormality has occurred in the power transmission unit.

4 Claims, 6 Drawing Sheets

(56) References Cited

U.S. PATENT DOCUMENTS

| | | | | |
|---|---|---|---|---|
| 7,410,080 | B2* | 8/2008 | Good | A45F 5/02 224/251 |
| 2003/0177649 | A1* | 9/2003 | Ito | G01D 5/2492 33/1 PT |
| 2006/0033643 | A1* | 2/2006 | Okamuro | G01D 5/24409 341/14 |
| 2006/0192517 | A1* | 8/2006 | Miyashita | H02P 6/165 318/652 |
| 2008/0051961 | A1* | 2/2008 | Ebashi | B62D 15/0215 701/41 |

FOREIGN PATENT DOCUMENTS

| | | |
|---|---|---|
| CN | 103650327 A | 3/2014 |
| JP | S 61-103750 A | 5/1986 |
| JP | 2003-094289 A | 4/2003 |
| JP | 2005-246534 A | 9/2005 |
| JP | 2009108923 | 5/2009 |
| JP | 2010-137310 A | 6/2010 |
| JP | 2011217515 | 10/2011 |
| KR | 2010-0096505 A | 9/2010 |

\* cited by examiner

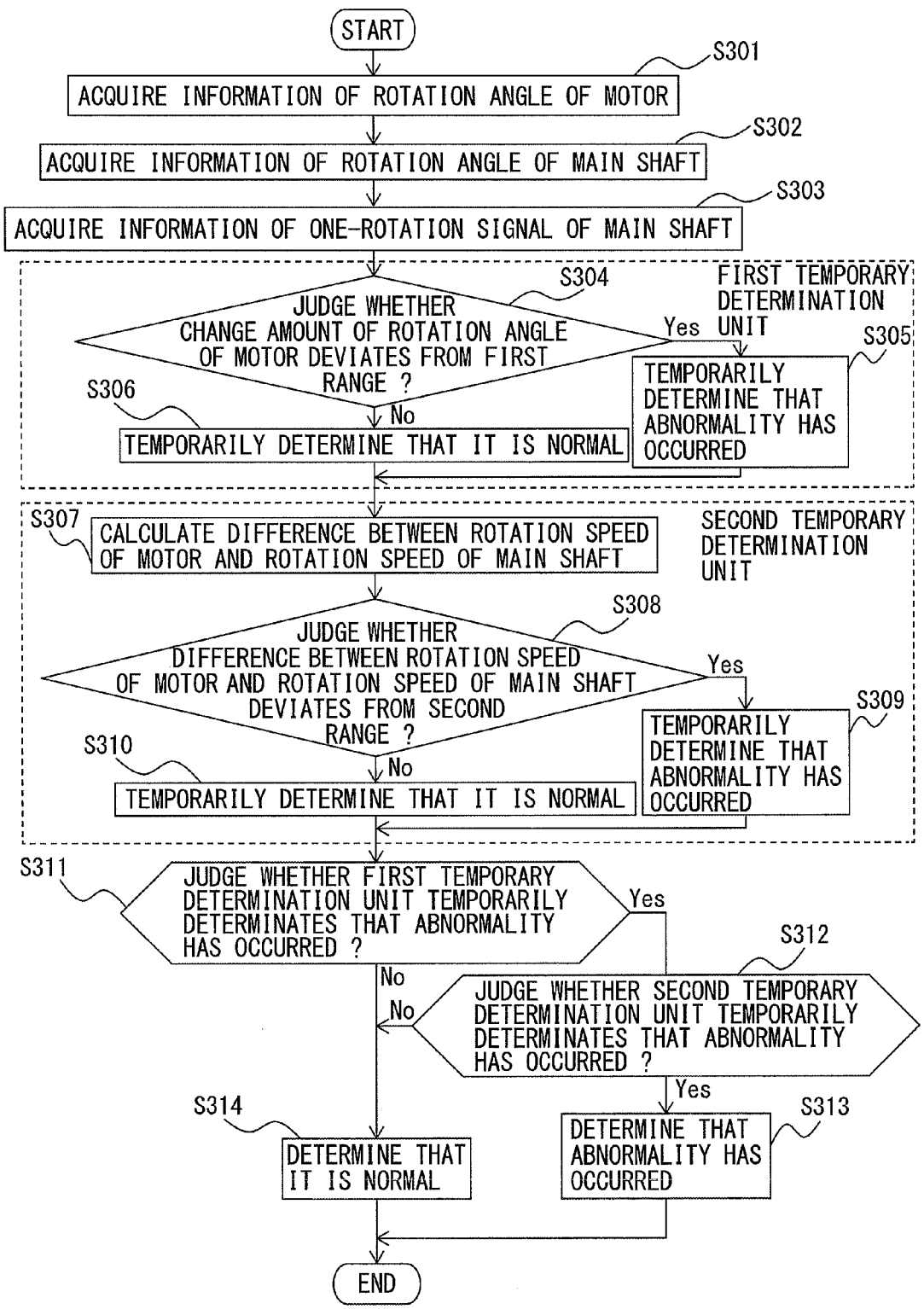

MOTOR CONTROLLER HAVING ABNORMALITY DETECTION FUNCTION OF POWER TRANSMISSION UNIT BETWEEN MOTOR AND MAIN SHAFT

BACKGROUND OF THE INVENTION

1. Field of the Invention

The present invention relates to a motor controller having an abnormality detection function of a power transmission unit between a motor and a main shaft.

2. Description of Related Art

For a machine tool, detection of an abnormality such as a slip which occurs at a power transmission unit such as a belt which transmits a rotational power of a motor to a main shaft has conventionally been performed.

For example, Japanese Unexamined Patent Publication No. 2010-137310 describes a device for detecting abnormality of a belt by using a sensor detecting load information of a motor and a state of a driving belt.

For example, Japanese Unexamined Patent Publication No. S61-103750 describes an abnormality detecting method in which the rotation speed of a main shaft and the rotation speed of a motor are compared, and when the difference between the rotation speed of a main shaft and the rotation speed of a motor deviates from a speed difference for which a speed reduction ratio prescribed between the motor and the main shaft is taken into consideration, it is determined that an abnormality has occurred in a power transmission unit between the main shaft and the motor.

For example, Japanese Unexamined Patent Publication No. 2003-94289 describes an abnormality detecting method in which a slip ratio is calculated by monitoring the rotation speed of a main shaft and the rotation speed of a motor to detect a slip which deviates from predetermined conditions.

For example, Japanese Unexamined Patent Publication No. 2005-246534 describes a method in which an instructed number of revolutions of a controller and an actual number of revolutions of a main shaft are compared, and when a state in which the ratio exceeds an allowable value continues for an allowable time, the state is judged to be abnormal to stop a main shaft motor.

For example, there is an abnormality detecting method comprising a means for detecting a one-rotation signal which outputs a signal every time a main shaft rotates once, in which the change amount of the rotation angle of a motor between the time when the one-rotation signal is detected and the time when the next one-rotation signal is detected is calculated, and when the change amount of the motor rotation angle between every one-rotation signals deviates from predetermined conditions, it is determined that an abnormality has occurred in a power transmission unit between the main shaft and the motor.

In the method in which an abnormality of a power transmission unit such as a belt or a gear between a main shaft and a motor is detected by using a comparative result between the rotation speed of the main shaft and the rotation speed of the motor, for eliminating an influence of a momentary slip in the power transmission unit, it is needed to apply a filter to the speed difference between the rotation speed of the main shaft and the rotation speed of the motor and to perform an abnormality detection process by using data after applying the filter. However, there is a problem that a detection delay due to the time constant of the filter occurs and it takes time to detect an abnormality particularly when the motor and main shaft rotate at a high speed.

On the other hand, in a method in which an abnormality of a power transmission unit between a main shaft and a motor is detected by using a change amount of the motor rotation angle between every one-rotation signals of the main shaft, a delay in detecting an abnormality when the motor and main shaft rotate at a high speed is small since the above-mentioned filter is not needed to be applied. However, there is a problem that a delay in detecting an abnormality may occur when the motor and main shaft rotate at a low speed since an abnormality detection process is performed only when a one-rotation signal is detected.

SUMMARY OF INVENTION

In view of the above-mentioned problems, an object of the present invention is to provide a motor controller having an abnormality detection function capable of stably detecting an abnormality of a power transmission unit between a motor and a main shaft over the whole rotation speed area of the motor and main shaft.

In order to attain the above object, a motor controller which controls the rotation drive of a motor in which a rotational power is transmitted to a main shaft via a power transmission unit includes:

a motor rotation angle acquisition unit acquiring the rotation angle of the motor;

a main shaft rotation angle acquisition unit acquiring the rotation angle of the main shaft;

a one-rotation signal acquisition unit acquiring a one-rotation signal output every time the main shaft rotates once;

a motor rotation speed calculation unit calculating the rotation speed of the motor from the acquired rotation angle of the motor;

a main shaft speed calculation unit calculating the rotation speed of the main shaft from the acquired rotation angle of the main shaft; and an abnormality determination unit in which, when a change amount of the rotation angle of the motor which is acquired between the time when a one-rotation signal is acquired and the time when the next one-rotation signal is acquired deviates from a first range or when the difference between the rotation speed of the motor and the rotation speed of the main shaft deviates from a second range, it is determined that an abnormality has occurred in the power transmission unit.

The motor controller includes:

a first temporary determination unit in which, when a change amount of the rotation angle of the motor acquired between the time when a one-rotation signal is acquired and the time when the next one-rotation signal is acquired deviates from the first range, it is temporarily determined that an abnormality has occurred in the power transmission unit; and a second temporary determination unit in which, when the difference between the rotation speed of the motor and the rotation speed of the main shaft deviates from the second range, it is temporarily determined that an abnormality has occurred in the power transmission unit, wherein, in the abnormality determination unit, when at least one of the first temporary determination unit and the second temporary determination unit temporarily determines that an abnormality has occurred in the power transmission unit, it may be determined that an abnormality has occurred in the power transmission unit.

In the motor controller, the second temporary determination unit includes a filter which removes a noise caused by a slip in the power transmission unit between the motor and the main shaft from the difference between the rotation speed of the motor and the rotation speed of the main shaft, and temporarily determines that an abnormality has occurred in the power transmission unit when the difference between the rotation speed of the motor and the rotation speed of the main shaft in which a noise is removed by the filter deviates from the second range, wherein, in the abnormality determination unit, when any one of the first temporary determination unit and the second temporary determination unit temporarily determines that an abnormality has occurred in the power transmission unit, it may be determined that an abnormality has occurred in the power transmission unit.

In the motor controller, in the abnormality determination unit, when both the first temporary determination unit and the second temporary determination unit temporarily determine that an abnormality has occurred in the power transmission unit, it may be determined that an abnormality has occurred in the power transmission unit.

In the motor controller, the first range and second range may be each prescribed based on a speed reduction ratio between the rotation speed of the motor and the rotation speed of the main shaft and a desired allowable error.

BRIEF DESCRIPTION OF THE DRAWINGS

The present invention will be more clearly understood by referring to the following attached Drawings.

FIG. 6 is a flow chart illustrating an operational flow of the motor controller according to the second Example illustrated in FIG. 5.

DETAILED DESCRIPTION

A motor controller having a detection function of an abnormality of a power transmission unit between a motor and a main shaft with reference to the Drawings. However, it should be understood that the present invention is not limited to the Drawings and Embodiments described below.

Figure 1:
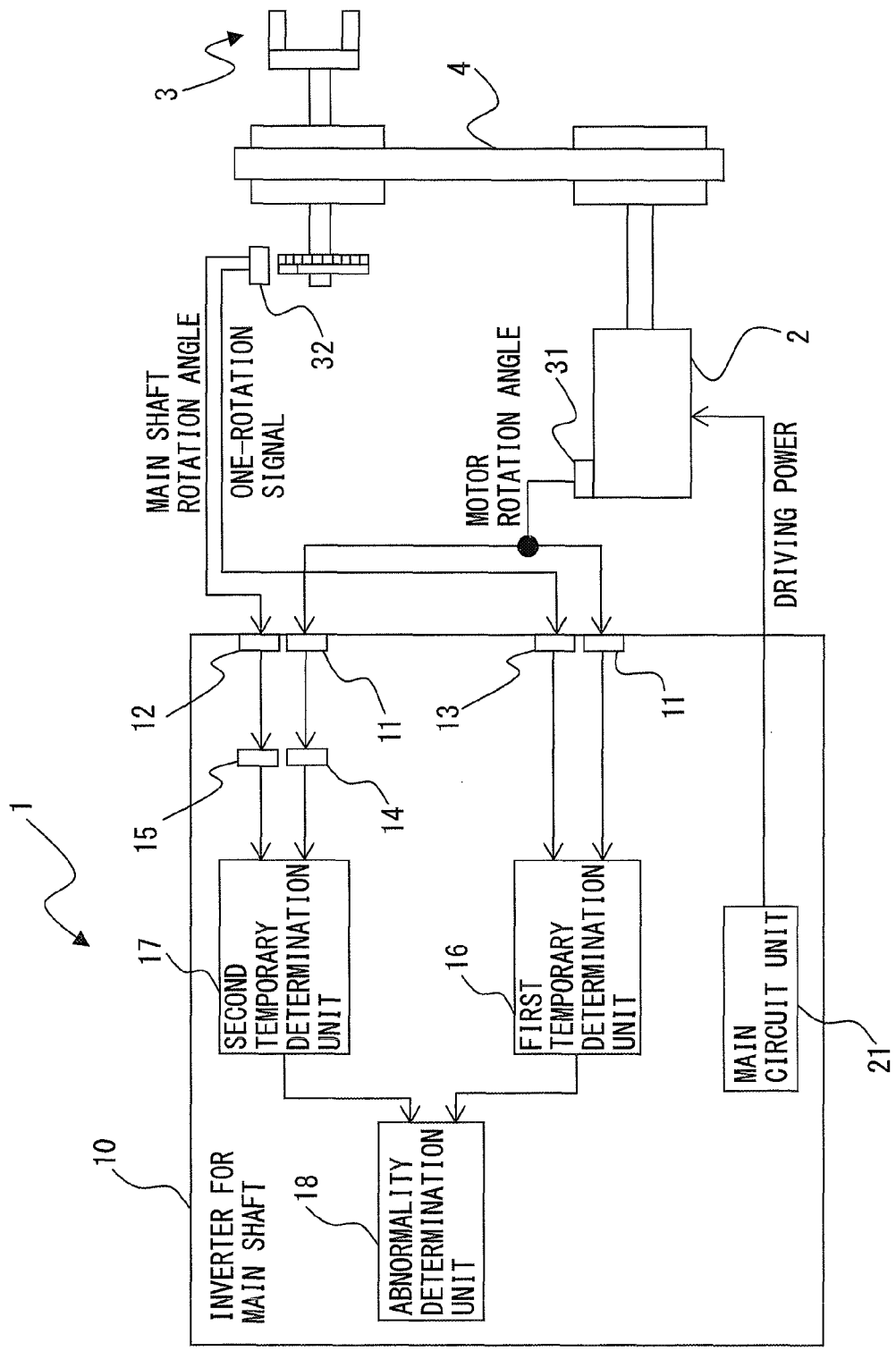
FIG. 1 is a principle block diagram of a motor controller.

FIG. 1 is a principle block diagram of a motor controller. Hereinafter, one indicated by a like reference sign represents a component having a like function. Herein, an explanation will be made regarding an example of a machine tool in which a rotational power of a motor 2 is transmitted to a main shaft 3 via a power transmission unit 4, wherein the motor 2 is rotationally driven by a motor controller 1. Example of the power transmission unit 4 include a belt and a gear.

A driving power of the motor 2 which allows the main shaft 3 to rotate via the power transmission unit 4 is generated by an inverter 10 for the main shaft. The inverter 10 for the main shaft includes a main circuit unit 21 in which a bridge circuit is assembled by a semiconductor switching element. The inverter 10 for the main shaft converts a DC power input from a rectifier (not illustrated) into a three-phase AC power with a desired voltage and a desired frequency for rotationally driving the motor 2 by switching operation of a semiconductor switching element in the main circuit unit 21 based on a drive command generated by a numerical control unit (not illustrated) in the motor controller 1. The motor 2 operates based on a provided three-phase AC power whose voltage is variable and whose frequency is variable. A rotational power of the motor 2 is transmitted to the main shaft 3 via the power transmission unit 4, whereby the main shaft 3 is rotationally driven. In general, the motor 2 is provided with a motor rotation angle detector 31 such as a rotary encoder detecting the rotation angle of a rotor (not illustrated). The main shaft 3 is provided with a main shaft rotation angle detector 32 such as a rotary encoder detecting the rotation angle of the main shaft. The main shaft rotation angle detector 32 detects the rotation angle of the main shaft 3, and in addition, outputs a one-rotation signal indicating that the main shaft 3 rotates once every time the main shaft 3 rotates once. In the motor controller 1, the rotation drive of the motor 2 is controlled by using information of a motor rotation angle and main shaft rotation angle from the motor rotation angle detector 31 and the main shaft rotation angle detector 32, the one-rotation signal, and the like.

In order to detect an abnormality in the power transmission unit 4 between the motor 2 and the main shaft 3, the motor controller 1 includes: a motor rotation angle acquisition unit 11; a main shaft rotation angle acquisition unit 12; a one-rotation signal acquisition unit 13; a motor rotation speed calculation unit 14; a main shaft speed calculation unit 15; a first temporary determination unit 16; a second temporary determination unit 17; and an abnormality determination unit 18.

The motor rotation angle acquisition unit 11 acquires information of the rotation angle of the motor 2 output from the motor rotation angle detector 31.

The main shaft rotation angle acquisition unit 12 acquires information of the rotation angle of the main shaft 3 output from the main shaft rotation angle detector 32.

The one-rotation signal acquisition unit 13 acquires the one-rotation signal of the main shaft 3 output from the main shaft rotation angle detector 32.

The motor rotation speed calculation unit 14 calculates the rotation speed of the motor 2 from information of the rotation angle of the motor 2 acquired from the motor rotation angle acquisition unit 11. For example, the motor rotation speed calculation unit 14 obtains the rotation speed of the motor 2 by differentiating the rotation angle of the motor 2.

The main shaft speed calculation unit 15 calculates the rotation speed of the main shaft 3 from information of the rotation angle of the main shaft 3 acquired from the main shaft rotation angle acquisition unit 12. For example, the main shaft speed calculation unit 15 obtains the rotation speed of the main shaft 3 by differentiating the rotation angle of the main shaft 3.

The first temporary determination unit 16 calculates a change amount of the rotation angle of the motor 2 acquired by the one-rotation signal acquisition unit 13 between the time when a one-rotation signal is acquired and the time when the next one-rotation signal is acquired, and judges whether the change amount deviates from the first range or not. The first range is preset based on a speed reduction ratio prescribed in the machine tool between the rotation speed of the motor 2 and the rotation speed of the main shaft 3, an error allowed in the process, or the like. When the calculated change amount of the rotation angle of the motor 2 deviates from the first range, the first temporary determination unit 16 temporarily determines that an abnormality has occurred in the power transmission unit 4.

The second temporary determination unit 17 calculates a difference between the rotation speed of the motor 2 and the rotation speed of the main shaft 3, and judges whether the difference deviates from the second range or not. The second range is preset based on a speed reduction ratio prescribed in the machine tool between the rotation speed of the motor 2 and the rotation speed of the main shaft 3, an error allowed in the process, or the like. When the calculated difference between the rotation speed of the motor 2 and the rotation speed of the main shaft 3 deviates from the second range, the second temporary determination unit 17 temporarily determines that an abnormality has occurred in the power transmission unit 4.

In the abnormality determination unit 18, when at least one of the first temporary determination unit 16 and the second temporary determination unit 17 temporarily determines that an abnormality has occurred in the power transmission unit 4, it is eventually determined that an abnormality has occurred in the power transmission unit 4. In other words, in the abnormality determination unit 18, when a change amount of the rotation angle of the motor 2 acquired by the one-rotation signal acquisition unit 13 between the time when a one-rotation signal is acquired and the time when the next one-rotation signal is acquired deviates from the first range or when the difference between the rotation speed of the motor 2 and the rotation speed of the main shaft 3 deviates from the second range, it is determined that an abnormality has occurred in the power transmission unit 4. An operator may be informed a determination result by the abnormality determination unit 18 by a notification means (not illustrated) such as a display, a lamp, or a buzzer, or the determination result may be stored in a storage means such as a hard disk or a memory. Alternatively, the determination result may be used as data when various abnormality avoiding operations of the machine tool when an abnormality occurs are carried out.

The motor rotation speed calculation unit 14, main shaft speed calculation unit 15, first temporary determination unit 16, second temporary determination unit 17, and abnormality determination unit 18 may be, for example, constructed in the form of a software program, or may be constructed in a combination of various electronic circuits and software programs. For example, the motor rotation speed calculation unit 14, main shaft speed calculation unit 15, first temporary determination unit 16, second temporary determination unit 17 and abnormality determination unit 18 are constructed in the form of a software program, an arithmetic processing unit in the motor controller 1 operates in accordance with the software program to realize functions of the above-mentioned motor rotation speed calculation unit 14, main shaft speed calculation unit 15, first temporary determination unit 16, second temporary determination unit 17, and abnormality determination unit 18. Therefore, an existing motor controller to which a motor rotation angle detection unit or a main shaft rotation angle detection unit is connected can be applied to the present invention by additionally installing a software program for the above-mentioned motor rotation speed calculation unit 14, main shaft speed calculation unit 15, first temporary determination unit 16, second temporary determination unit 17, and abnormality determination unit 18.

Alternatively, the above-mentioned motor rotation speed calculation unit 14, main shaft speed calculation unit 15, first temporary determination unit 16, second temporary determination unit 17, and abnormality determination unit 18 may be accommodated in one housing to realize a single abnormality detector. In such a case, an abnormality detector can be additionally attached to the existing motor controller to which a motor rotation angle detection unit or main shaft rotation angle detection unit.

Figure 2:
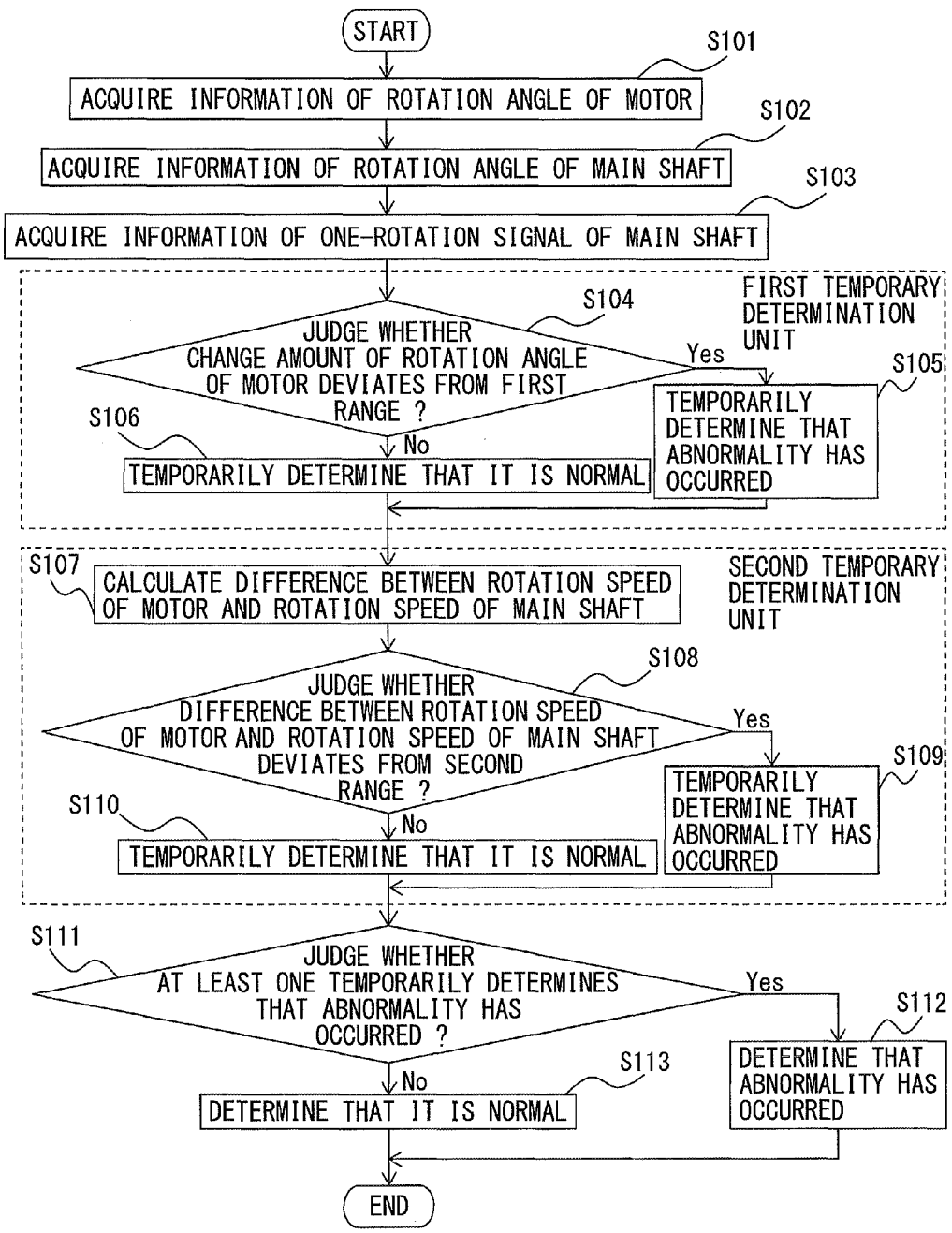
FIG. 2 is a flow chart illustrating an operational flow of the motor controller illustrated in FIG. 1.

FIG. 2 is a flow chart illustrating an operational flow of the motor controller illustrated in FIG. 1.

First, in step S101, the motor rotation angle acquisition unit 11 acquires information of the rotation angle of the motor 2 output from the motor rotation angle detector 31.

In step S102, the main shaft rotation angle acquisition unit 12 acquires information of the rotation angle of the main shaft 3 output from the main shaft rotation angle detector 32. The information of the rotation angle of the motor 2 obtained by a process in step S101 and the information of the rotation angle of the motor 2 obtained by a process in step S102 are output at the same time from the motor rotation angle detection unit 31 and main shaft rotation angle detection unit 32.

In step S103, the one-rotation signal acquisition unit 13 acquires a one-rotation signal of the main shaft 3 output from the main shaft rotation angle detector 32.

Next, in step S104, the first temporary determination unit 16 calculates a change amount of the rotation angle of the motor 2 acquired by the one-rotation signal acquisition unit 13 between the time when a one-rotation signal is acquired and the time when the next one-rotation signal is acquired, and judges whether the change amount deviates from the first range or not. The time between when the one-rotation signal acquisition unit 13 acquires a one-rotation signal and when it acquires the next one-rotation signal corresponds to the time of one rotation of the main shaft 3.

In the first temporary determination unit 16, when it is judged that a change amount of the rotation angle of the motor 2 deviates from the first range in step S104, it is temporarily determined that an abnormality has occurred in the power transmission unit 4 in step S105.

In the first temporary determination unit 16, when it is judged that a change amount of the rotation angle of the motor 2 does not deviate from the first range in step S104, it is temporarily determined that the power transmission unit 4 is normal in step S106.

In step S107, the second temporary determination unit 17 calculates the difference between the rotation speed of the motor 2 and the rotation speed of the main shaft 3. After performing acquisition processing of information of the rotation angle of the motor 2 by the motor rotation angle acquisition unit 11 in step S101 and acquisition processing of the rotation angle of the main shaft 3 by the main shaft rotation angle acquisition unit 12 in step S102 and before performing calculation processing of the rotation speed difference in step S107, calculation processing of the rotation speed of the motor 2 by the motor rotation speed calculation unit 14 and calculation processing of the rotation speed of the main shaft 3 by the main shaft speed calculation unit 15 are performed.

In step S108, the second temporary determination unit 17 judges whether the difference between the rotation speed of the motor 2 and the rotation speed of the main shaft 3 deviates from the second range or not.

In the second temporary determination unit 17, when it is judged that the difference between the rotation speed of the motor 2 and the rotation speed of the main shaft 3 deviates from the second range in step S108, it is temporarily determined that an abnormality has occurred in the power transmission unit 4 in step S109.

In the second temporary determination unit 17, when it is judged that the difference between the rotation speed of the motor 2 and the rotation speed of the main shaft 3 deviates from the second range in step S108, it is temporarily determined that the power transmission unit 4 is normal in step S110.

In step S111, the abnormality determination unit 18 judges whether at least one of the first temporary determination unit 16 and second temporary determination unit 17 temporarily determines that an abnormality has occurred in the power transmission unit 4 or not.

In the abnormality determination unit 18, when at least one of the first temporary determination unit 16 and second temporary determination unit 17 temporarily determines that an abnormality has occurred in the power transmission unit 4 in step S111, it is eventually determined that an abnormality has occurred in the power transmission unit 4.

In the abnormality determination unit 18, when any of the first temporary determination unit 16 and second temporary determination unit 17 temporarily determine that the power transmission unit 4 is normal in step S111, it is eventually determined that the power transmission unit 4 is normal in step S113. Thereafter, returning to step S101, the above-mentioned processes are repeatedly performed.

Figure 3:
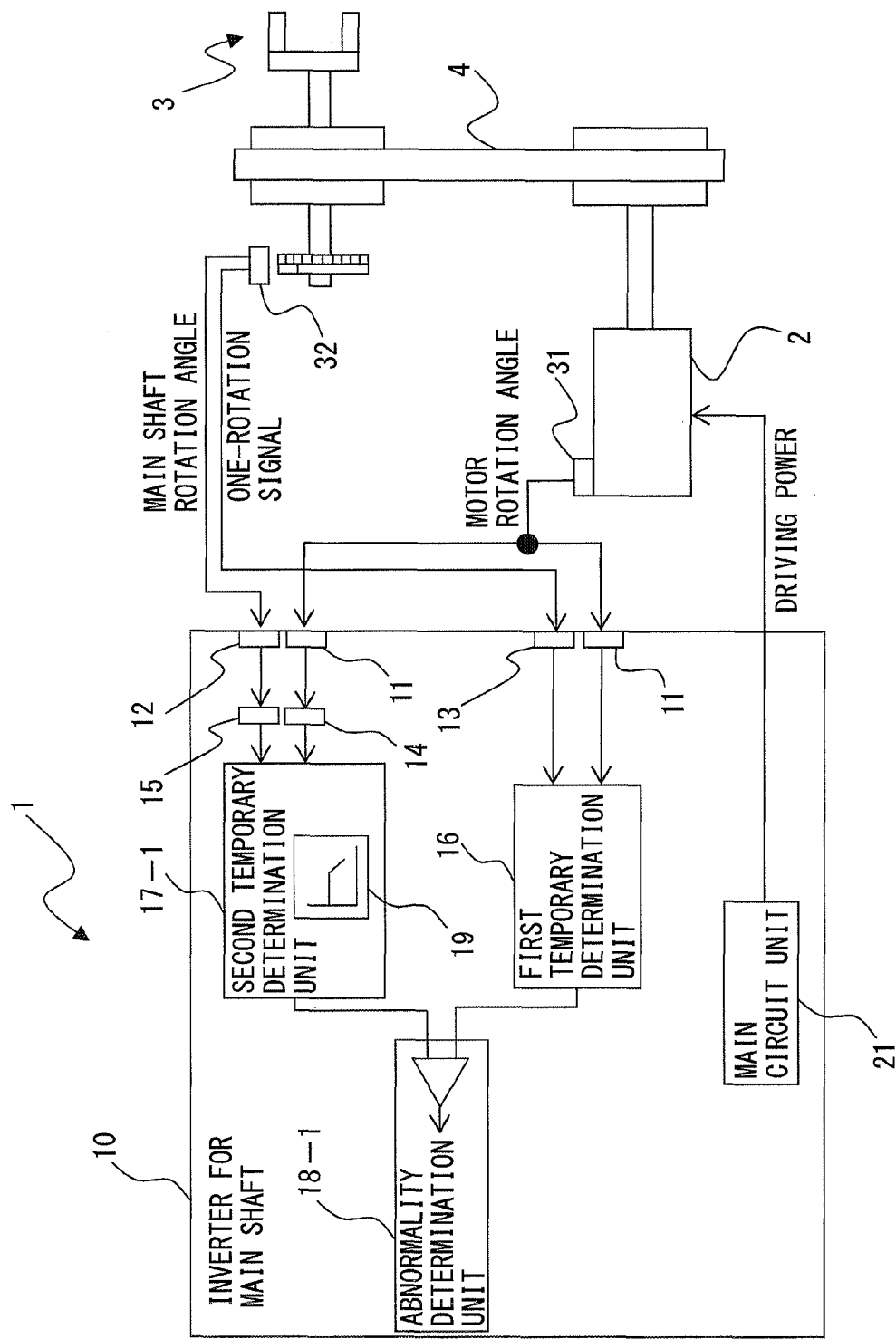
FIG. 3 is a principle block diagram of a motor controller according to a first Example.

FIG. 3 is a principle block diagram of the motor controller of the first Example. In the first Example, a second temporary determination unit 17-1 is provided with a filter 19. The filter 19 removes a noise caused by a slip in the power transmission unit 4 between the motor 2 and the main shaft 3 from the difference between the rotation speed of the motor 2 and the rotation speed of the main shaft 3. Since the noise includes a high frequency component, the filter 19 is composed of a low pass filter. In the second temporary determination unit 17-1, the filter is applied to data of the difference between the rotation speed of the motor 2 and the rotation speed of the main shaft 3, and it is judged based on the data to which the filter is applied whether the difference deviates from the second range or not.

In the second temporary determination unit 17-1, although the filter is applied to the data of the difference between the rotation speed of the motor 2 and the rotation speed of the main shaft 3, the time constant of the filter is not so long. Therefore, there is an advantage that an effect of a delay is small with respect to abnormality detection of the motor 2 and main shaft 3 when rotating at a slow speed.

On the other hand, in the first temporary determination unit 16, a change amount of the rotation angle of the motor 2 acquired by the one-rotation signal acquisition unit 13 between the time when a one-rotation signal is acquired and the time when the next one-rotation signal is acquired is calculated, and it is judged whether the change amount deviates from the first range or not. In the first temporary determination unit 16, since such a filter as in the second temporary determination unit 17-1 is not applied, an abnormality detection delay of the motor and main shaft when rotating at a high speed is small. Since an interval at which a one-rotation signal of the main shaft 3 is acquired is a cycle, there is an advantage that an abnormality detection can be performed speedily without delay even when the motor 2 and main shaft 3 rotate at a high speed.

In other words, since, when the motor 2 and main shaft 3 rotate at a low speed, the abnormality detection delay in the second temporary determination unit 17-1 is smaller than that in the first temporary determination unit 16, the second temporary determination unit 17-1 can detect the occurrence of an abnormality in the power transmission unit 4 earlier. Since, when the motor 2 and main shaft 3 rotate at a high speed, the abnormality detection delay in the first temporary determination unit 16 is smaller than that in the second temporary determination unit 17-1, the first temporary determination unit 16 can detect the occurrence of an abnormality in the power transmission unit 4 earlier. Therefore, in the first Example, an abnormality determination unit 18-1 is constructed taking advantages of each of the first temporary determination unit 16 and second temporary determination unit 17-1 such that an abnormality detection of the power transmission unit 4 is performed by the first temporary determination unit 16 when the motor 2 and main shaft 3 rotate at a high speed and is performed by the second temporary determination unit 17-1 when the motor 2 and main shaft 3 rotate at a low speed. In other words, in the abnormality determination unit 18-1, any one of the first temporary determination unit 16 and second temporary determination unit 17-1 temporarily determine that an abnormality has occurred in the power transmission unit 4, it is eventually determined that an abnormality has occurred in the power transmission unit 4. In cases in which the abnormality determination unit 18-1 is constructed in such a manner, when an abnormality has occurred in the power transmission unit 4 at the time when the motor 2 and main shaft 3 rotate at a low speed, the second temporary determination unit 17-1 detects the occurrence of the abnormality prior to the first temporary determination unit 16, and therefore, the abnormality determination unit 18-1 determines that an abnormality has occurred in the power transmission unit 4; and when an abnormality has occurred in the power transmission unit 4 at the time when the motor 2 and main shaft 3 rotate at a high speed, the second temporary determination unit 16 detects the occurrence of the abnormality prior to the first temporary determination unit 17-1, and therefore, the abnormality determination unit 18-1 determines that an abnormality has occurred in the power transmission unit 4. As mentioned above, according to the first Example, when a value obtained by applying a filter to the data of the difference between the rotation speed of the motor 2 and the rotation speed of the main shaft 3 deviates from the second range or when a change amount of the rotation angle of the motor 2 during one rotation of the main shaft 3 deviates from the first range, it is determined that an abnormality has occurred in the power transmission unit 4.

The second temporary determination unit 17-1 and abnormality determination unit 18-1 may be constructed, for example, in the form of a software program, or may be constructed in a combination of various electronic circuits and software programs. For example, when the second temporary determination unit 17-1 and abnormality determination unit 18-1 are constructed in the form of a software program, an arithmetic processing unit in the motor controller 1 operates in accordance with the software program to realize functions of the above-mentioned second temporary determination unit 17-1 and abnormality determination unit 18-1.

Since other circuit components than the above mentioned components are similar to the circuit components illustrated in FIG. 1, detailed description of the circuit components is omitted by indicating the identical circuit component by the identical sign.

Figure 4:
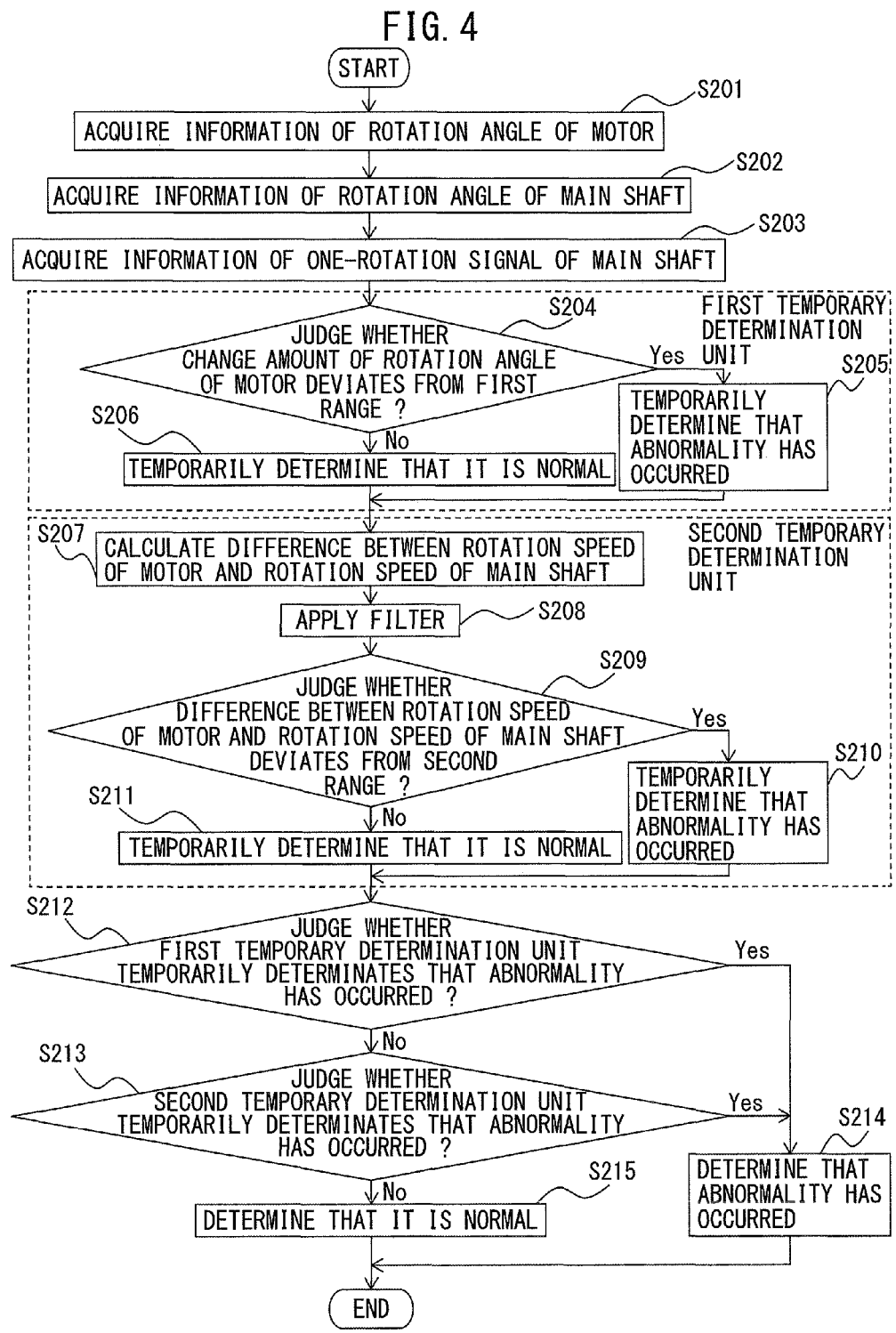
FIG. 4 is a flow chart illustrating an operational flow of the motor controller according to the first Example illustrated in FIG. 3.

FIG. 4 is a flow chart illustrating an operational flow of the motor controller according to the first Example illustrated in FIG. 3.

First, in step S201, the motor rotation angle acquisition unit 11 acquires information of the rotation angle of the motor 2 output from the motor rotation angle detector 31.

In step S202, the main shaft rotation angle acquisition unit 12 acquires information of the rotation angle of the main shaft 3 output from the main shaft rotation angle detector 32. The information of the rotation angle of the motor 2 obtained by a process in step S201 and the information of the rotation angle of the motor 2 obtained by a process in step S202 are output at the same time from the motor rotation angle detection unit 31 and main shaft rotation angle detection unit 32.

In step S203, the one-rotation signal acquisition unit 13 acquires a one-rotation signal of the main shaft 3 output from the main shaft rotation angle detector 32.

Next, in step S204, the first temporary determination unit 16 calculates a change amount of the rotation angle of the motor 2 acquired by the one-rotation signal acquisition unit 13 between the time when a one-rotation signal is acquired and the time when the next one-rotation signal is acquired, and judges whether the change amount deviates from the first range or not.

In the first temporary determination unit 16, when it is judged that a change amount of the rotation angle of the motor 2 deviates from the first range in step S204, it is temporarily determined that an abnormality has occurred in the power transmission unit 4 in step S205.

In the first temporary determination unit 16, when it is judged that a change amount of the rotation angle of the motor 2 does not deviate from the first range in step S204, it is temporarily determined that the power transmission unit 4 is normal in step S206.

In step S207, the second temporary determination unit 17-1 calculates the difference between the rotation speed of the motor 2 and the rotation speed of the main shaft 3. After performing acquisition processing of information of the rotation angle of the motor 2 by the motor rotation angle acquisition unit 11 in step S201 and acquisition processing of the rotation angle of the main shaft 3 by the main shaft rotation angle acquisition unit 12 in step S202 and before performing calculation processing of the rotation speed difference in step S207, calculation processing of the rotation speed of the motor 2 by the motor rotation speed calculation unit 14 and calculation processing of the rotation speed of the main shaft 3 by the main shaft speed calculation unit 15 are performed.

In step S208, the second temporary determination unit 17-1 applies a filter to data of the difference between the rotation speed of the motor 2 and the rotation speed of the main shaft 3. In other words, a noise caused by a slip in the power transmission unit 4 between the motor 2 and the main shaft 3 is removed from the difference between the rotation speed of the motor 2 and the rotation speed of the main shaft 3 by a filter 19 in the second temporary determination unit 17-1.

In step S209, the second temporary determination unit 17-1 judges whether data after the filter is applied relating to the difference between the rotation speed of the motor 2 and the rotation speed of the main shaft 3 deviates from the second range or not.

In the second temporary determination unit 17-1, when it is judged that data after the filter is applied relating to the difference between the rotation speed of the motor 2 and the rotation speed of the main shaft 3 deviates from the second range in step S209, it is temporarily determined that an abnormality has occurred in the power transmission unit 4 in step S210.

In the second temporary determination unit 17-1, when it is judged that data after the filter is applied relating to the difference between the rotation speed of the motor 2 and the rotation speed of the main shaft 3 deviates from the second range in step S209, it is temporarily determined that the power transmission unit 4 is normal in step S211.

In step S212, the abnormality determination unit 18-1 judges whether the first temporary determination unit 16 temporarily determines that an abnormality has occurred in the power transmission unit 4 or not.

In the abnormality determination unit 18-1, when the first temporary determination unit 16 temporarily determines that an abnormality has occurred in the power transmission unit 4 in step S212, it is eventually determined that an abnormality has occurred in the power transmission unit 4 in step S214.

In the abnormality determination unit 18-1, when the first temporary determination unit 16 temporarily determines that the power transmission unit 4 is normal in step S212, it is judged whether the second temporary determination unit 17-1 temporarily determines that an abnormality has occurred in the power transmission unit 4 in step S213 or not.

In the abnormality determination unit 18-1, when the second temporary determination unit 17-1 temporarily determines that an abnormality has occurred in the power transmission unit 4 in step S213, it is eventually determined that an abnormality has occurred in the power transmission unit 4 in step S214.

In the abnormality determination unit 18-1, when the second temporary determination unit 17-1 temporarily determines that the power transmission unit 4 is normal in step S213, it is eventually determined that the power transmission unit 4 is normal in step S215. Thereafter, returning to step S201, the above-mentioned processes are repeatedly performed.

Figure 5:
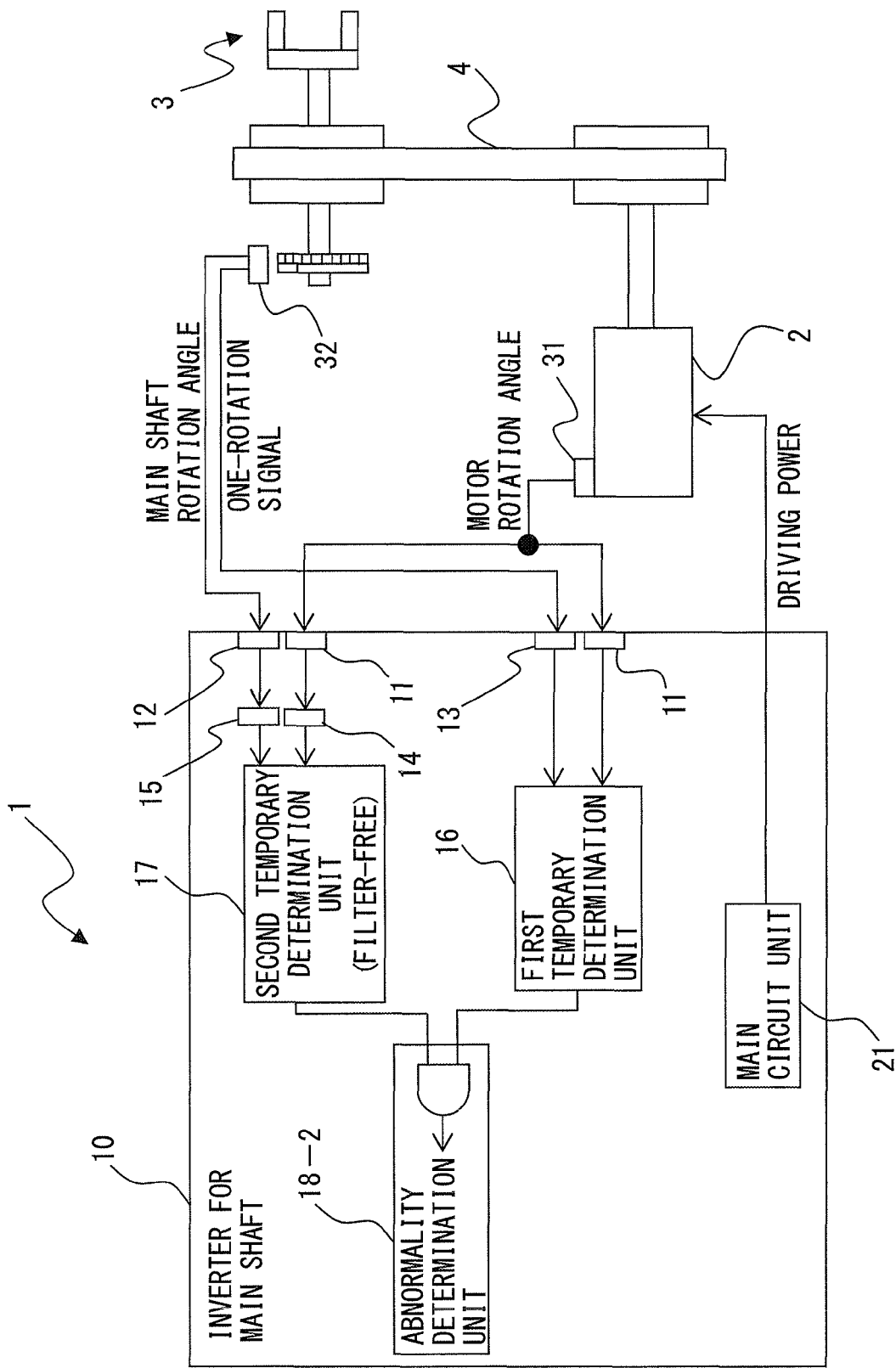
FIG. 5 is a principle block diagram of a motor controller according to a second Example.

FIG. 5 is a principle block diagram of the motor controller according to a second Example. In the second Example, in an abnormality determination unit 18-2, when both the first temporary determination unit 16 and second temporary determination unit 17 temporarily determine that an abnormality has occurred in the power transmission unit 4, it is determined that an abnormality has occurred in the power transmission unit 4. In such a case, unlike the first Example, there is no need to provide the second temporary determination unit 17 with a filter, and the operation thereof is as described above with reference to FIG. 1 and FIG. 2.

Since the second temporary determination unit 17 is not provided with a filter, it may be erroneously determined that a momentary slip on the power transmission unit 4 is "occurrence of an abnormality". On the other hand, in the first temporary determination unit 16, since a change amount of the rotation angle of the motor 2 acquired by the one-rotation signal acquisition unit 13 between the time when a one-rotation signal is acquired and the time when the next one-rotation signal is acquired is calculated, and it is judged whether the change amount deviates from the first range or not, the possibility that a momentary slip in the power transmission unit 4 is erroneously determined to be "occurrence of an abnormality" is low when the first range is set to be wide to a certain degree. Therefore, in the second Example, an abnormality determination unit 18-2 is constructed taking advantages of each of the first temporary determination unit 16 and second temporary determination unit 17 such that, only when both the first temporary determination unit 16 and second temporary determination unit 17 temporarily determines that an abnormality occurs in the power transmission unit 4, it is eventually determined that an abnormality has occurred in the power transmission unit 4. Such a construction prevents erroneous detection that a momentary slip in the power transmission unit 4 is "occurrence of an abnormality".

The abnormality determination unit 18-2 may be constructed, for example, in the form of a software program, or may be constructed in a combination of various electronic circuits and software programs. For example, when the abnormality determination unit 18-2 is constructed in the form of a software program, an arithmetic processing unit in the motor controller 1 operates in accordance with the software program to realize functions of the above-mentioned abnormality determination unit 18-2.

Since other circuit components than the above mentioned components are similar to the circuit components illustrated in FIG. 1, detailed description of the circuit components is omitted by indicating the identical circuit component by the identical sign.

FIG. 6 is a flow chart illustrating an operational flow of the motor controller according to the second Example illustrated in FIG. 5.

First, in step S301, the motor rotation angle acquisition unit 11 acquires information of the rotation angle of the motor 2 output from the motor rotation angle detector 31.

In step S302, the main shaft rotation angle acquisition unit 12 acquires information of the rotation angle of the main shaft 3 output from the main shaft rotation angle detector 32. The information of the rotation angle of the motor 2 obtained by a process in step S301 and the information of the rotation angle of the motor 2 obtained by a process in step S302 are output at the same time from the motor rotation angle detection unit 31 and main shaft rotation angle detection unit 32.

In step S303, the one-rotation signal acquisition unit 13 acquires a one-rotation signal of the main shaft 3 output from the main shaft rotation angle detector 32.

Next, in step S304, the first temporary determination unit 16 calculates a change amount of the rotation angle of the motor 2 acquired by the one-rotation signal acquisition unit 13 between the time when a one-rotation signal is acquired and the time when the next one-rotation signal is acquired, and judges whether the change amount deviates from the first range or not.

In the first temporary determination unit 16, when it is judged that a change amount of the rotation angle of the motor 2 deviates from the first range in step S304, it is temporarily determined that an abnormality has occurred in the power transmission unit 4 in step S305.

In the first temporary determination unit 16, when it is judged that a change amount of the rotation angle of the motor 2 does not deviate from the first range in step S304, it is temporarily determined that the power transmission unit 4 is normal in step S306.

In step S307, the second temporary determination unit 17 calculates the difference between the rotation speed of the motor 2 and the rotation speed of the main shaft 3. After performing acquisition processing of information of the rotation angle of the motor 2 by the motor rotation angle acquisition unit 11 in step S301 and acquisition processing of the rotation angle of the main shaft 3 by the main shaft rotation angle acquisition unit 12 in step S302 and before performing calculation processing of the rotation speed difference in step S307, calculation processing of the rotation speed of the motor 2 by the motor rotation speed calculation unit 14 and calculation processing of the rotation speed of the main shaft 3 by the main shaft speed calculation unit 15 are performed.

In step S308, the second temporary determination unit 17 applies a filter to data of the difference between the rotation speed of the motor 2 and the rotation speed of the main shaft 3.

In the second temporary determination unit 17, when it is judged that the difference between the rotation speed of the motor 2 and the rotation speed of the main shaft 3 deviates from the second range in step S308, it is temporarily determined that an abnormality has occurred in the power transmission unit 4 in step S309.

In the second temporary determination unit 17, when it is judged that the difference between the rotation speed of the motor 2 and the rotation speed of the main shaft 3 deviates from the second range in step S308, it is temporarily determined that the power transmission unit 4 is normal in step S310.

In step S311, the abnormality determination unit 18-2 judges whether the first temporary determination unit 16 temporarily determines that an abnormality has occurred in the power transmission unit 4 or not.

In the abnormality determination unit 18-2, when the first temporary determination unit 16 temporarily determines that an abnormality has occurred in the power transmission unit 4 in step S311, the abnormality determination unit proceeds to step S312.

In the abnormality determination unit 18-2, when the first temporary determination unit 16 temporarily determines that the power transmission unit 4 is normal in step S311, it is then determined that the power transmission unit 4 is normal in step S314. Thereafter, returning to step S301, the above-mentioned processes are repeatedly performed.

In the abnormality determination unit 18-2, it is judged whether the second temporary determination unit 17 temporarily determines that an abnormality has occurred in the power transmission unit 4 in step S312 or not.

In the abnormality determination unit 18-2, when the second temporary determination unit 17 temporarily determines that an abnormality has occurred in the power transmission unit 4 in step S312, it is then determined that an abnormality has occurred in the power transmission unit 4 in step S313.

In the abnormality determination unit 18-2, when the second temporary determination unit 17 temporarily determines that the power transmission unit 4 is normal in step S312, it is then determined that the power transmission unit 4 is normal in step S314. Thereafter, returning to step S301, the above-mentioned processes are repeatedly performed.

The present invention can be applied to a machine tool in which rotation drive of a motor is controlled by a motor controller to which a motor rotation angle detection unit and a main shaft rotation angle detection unit is connected, and the rotational power of the motor is transmitted to a main shaft via a power transmission unit such as a belt or a gear, whereby the main shaft rotates.

According to the present invention, a motor controller having an abnormality detection function capable of stably detecting an abnormality of a power transmission unit between a motor and a main shaft over the whole rotation speed area of the motor and main shaft.

According to the first Example, when a value obtained by applying a filter to the data of the difference between the rotation speed of a motor and the rotation speed of a main shaft deviates from a prescribed range or when a change amount of the rotation angle of the motor during one rotation of the main shaft deviates from a prescribed range, it is determined that an abnormality has occurred in the power transmission unit, and therefore, an abnormality of a power transmission unit between a motor and a main shaft can be detected over the whole rotation speed area of the motor and main shaft at an early stage.

According to the second Example, when a value obtained by applying a filter to the data of the difference between the rotation speed of a motor and the rotation speed of a main shaft deviates from a prescribed range and when a change amount of the rotation angle of the motor during one rotation of the main shaft deviates from a prescribed range, it is determined that an abnormality has occurred in the power transmission unit, and therefore, an abnormality of a power transmission unit between a motor and a main shaft can be detected over the whole rotation speed area of the motor and main shaft without an erroneous detection.

What is claimed is:

1. A motor controller which controls the rotation drive of a motor in which a rotational power is transmitted to a main shaft via a power transmission unit, comprising:
   a motor rotation angle acquisition unit acquiring the rotation angle of the motor;

a main shaft rotation angle acquisition unit acquiring the rotation angle of the main shaft;

a one-rotation signal acquisition unit acquiring a one-rotation signal output every time the main shaft rotates once;

a motor rotation speed calculation unit calculating the rotation speed of the motor from the acquired rotation angle of the motor;

a main shaft speed calculation unit calculating the rotation speed of the main shaft from the acquired rotation angle of the main shaft;

a first temporary determination unit in which, when a change amount of the rotation angle of the motor acquired between the time when a one-rotation signal is acquired and the time when the next one-rotation signal is acquired deviates from a first range, it is temporarily determined that an abnormality has occurred in the power transmission unit;

a second temporary determination unit in which, when the difference between the rotation speed of the motor and the rotation speed of the main shaft deviates from a second range, it is temporarily determined that an abnormality has occurred in the power transmission unit; and an abnormality determination unit in which, when at least one of the first temporary determination unit and the second temporary determination unit temporarily determines that an abnormality has occurred in the power transmission unit, it is determined that an abnormality has occurred in the power transmission unit.

2. The motor controller according to claim 1, wherein the second temporary determination unit comprises a filter which removes a noise caused by a slip in the power transmission unit between the motor and the main shaft from the difference between the rotation speed of the motor and the rotation speed of the main shaft, and temporarily determines that an abnormality has occurred in the power transmission unit when the difference between the rotation speed of the motor and the rotation speed of the main shaft in which a noise is removed by the filter deviates from the second range, wherein, in the abnormality determination unit, when any one of the first temporary determination unit and the second temporary determination unit temporarily determines that an abnormality has occurred in the power transmission unit, it is determined that an abnormality has occurred in the power transmission unit.

3. The motor controller according to claim 1, wherein, in the abnormality determination unit, when both the first temporary determination unit and the second temporary determination unit temporarily determine that an abnormality has occurred in the power transmission unit, it is determined that an abnormality has occurred in the power transmission unit.

4. The motor controller according to claim 1, wherein the first range and second range are each prescribed based on a speed reduction ratio between the rotation speed of the motor and the rotation speed of the main shaft and a desired allowable error.

* * * * *